United States Patent Office 2,815,374
Patented Dec. 3, 1957

2,815,374

PURIFICATION OF GLUTAMIC ACID WITH THE AID OF METHANOLIC CALCIUM CHLORIDE

Elmer V. McCollum, Baltimore, Md.

No Drawing. Application January 14, 1957,
Serial No. 633,853

15 Claims. (Cl. 260—527)

This is a continuation-in-part of my application, Serial No. 364,479, filed June 26, 1953, now abandoned.

The present invention relates to a new and useful process for recovering glutamic acid in nearly pure form and in high yield from mixtures of the same with other amino acids.

The mixtures of glutamic acid, or its precursors, with other amino acids with which the present invention is concerned are normally available in the acid hydrolysates of proteins, and in beet mollasses and in the waste liquor produced after the crystallization of beet sugar, etc.

In accordance with the present invention, glutamic acid is separated from admixture with other amino acids by dissolving the mixture of acids in methanol, preferably containing ammonia or an equivalent organic base and thereafter precipitating glutamic acid from such solution by the addition thereto of calcium chloride which apparently forms, with the glutamic acid, a double compound of calcium glutamate with calcium chloride. This double compound is but sparingly soluble in methanol and precipitates out in yields of 90% or better, leaving in solution all but insignificant amounts of the other amino acids. Glutamic acid can be prepared from the aforementioned double compound by any of the known conventional procedures for converting calcium glutamate into glutamic acid.

Accordingly, the principal object of the present invention is the recovery of glutamic acid in nearly pure form and in high yield from mixtures of the same with other amino acids.

Other and further objects of the invention will become apparent from the description which follows.

The protein hydrolysates from which glutamic acid is extracted by the present invention may be produced by conventional hydrolysis of proteins as by boiling the protein with a mineral acid such as sulfuric or hydrochloric acid. In accordance with the present invention the protein hydrolysate is preferably substantially dry and free of mineral acid. Accordingly, water and mineral acid present in the protein hydrolysate are desirably removed at least to as great a degree as practicable.

Among suitable sources of glutamic acid suitable for use in the present invention are protein hydrolysates such as corn gluten hydrolysate, zein hydrolysate, and soybean protein hydrolysate and Steffens' liquor hydrolysate.

Processes of removing water and mineral acid from protein hydrolysate other than the illustrative processes which follow will be evident to those skilled in the art, and the present invention is not intended to be restricted to any particular hydrolyzing acid or removal procedure.

When sulfuric acid is employed in the hydrolysis process, it can be removed by neutralization with an alkaline earth metal e. g. by addition of lime, to effect precipitation of the insoluble sulfate. After removal of the precipitate, the filtrate is evaporated to dryness to produce a dry protein hydrolysate which is substantially free from mineral acid. Yields of glutamic acid are lowered by this process because of formation of calcium glutamate, with any excess lime present, which tends to precipitate with the calcium sulfate.

When hydrochloric acid is employed in the hydrolysis process, part of the acid can be removed by distillation. However, a portion of the hydrochloric acid present cannot be driven off without resort to high temperatures which lead to decomposition of amino acids. This residual acid may be neutralized with an alkali or alkaline earth metal hydroxide e. g. sodium or calcium hydroxide. Preferably, however, ammonia is employed to effect neutralization since it is preferred to have ammonia present in the steps of the process which follow. In any event the neutralized solution containing the amino acids and the chloride salt, preferably ammonium chloride, is evaporated to dryness to produce a dry protein hydrolysate which is substantially free from mineral acid.

In accordance with the present invention, the dry hydrolysate is treated with methanol, preferably containing ammonia dissolved therein. Preferably such solution contains as little water as possible. The methanol with or without ammonia is a good solvent for amino acids and will dissolve most, if not all of the amino acids including glutamic acid of the hydrolysate. Any undissolved amino acids or foreign matter including chloride may then be removed by filtration and discarded.

The solution of glutamic and other amino acids in the methanol or ammonia in methanol solution is then treated with dry, substantially dehydrated, calcium chloride in amount at least sufficient to precipitate almost all of the glutamic acid originally present in the form of a double compound consisting of calcium glutamate united with calcium chloride. The solubility of this double compound in methanol or in a solution of ammonia in methanol is very small and the precipitate may be washed with either to free the precipitate from mother liquor and produce a precipitate which is substantially free of amino acids other than glutamic acid and which contains at least about 90% of the glutamic acid present in the original hydrolysate.

The formation of calcium glutamate in water solution followed by concentration of this solution and precipitation of calcium glutamate by dilution with an alcohol such as methanol or ethanol has been practiced by others for many years and is described in the literature. In prior methods of this type, calcium has been employed in the form of lime to cause the formation of calcium glutamate. Calcium chloride cannot be substituted for lime in such prior methods, because it does not lead to transfer of calcium from the chloride part of the molecule to glutamic acid to form the calcium salt thereof.

If, instead of using calcium chloride to precipitate the double compound described, lime is added to a substantially water-free solution of amino acids in methanol or ammonia containing methanol, some calcium glutamate is formed, but the yield of glutamic acid obtained when lime is used is of the order of 65%. When calcium chloride is employed as the precipitating reagent, as in the present invention, a double compound of calcium glutamate with calcium chloride is formed which is most unexpected since it would normally be thought, as in the case where lime is used, that calcium glutamate and possibly some calcium asparate would be formed. The extremely low solubility of this double compound leads to the precipitation of about 90% and better of the glutamic acid present which is a decided and valuable improvement over the previously obtained 65% yields.

It will be appreciated that the present invention employs methanol (preferably containing ammonia) as solvent and not as diluent in an aqueous system, as in certain other procedures which have be employed for securing glutamic acid. In fact, in the present invention, moisture is preferably excluded from all of the ingredients employed in the process. However, a small amount of water in the system e. g. up to about 10% or in some cases 15% does not vitiate the utility of the present invention, although a decrease in the yield of the double compound occurs.

When reference is made to "water in the system" this term is intended to refer to "free water" as distinguished from "bound water." Free water is the water available to dilute the methanol in contrast to "bound water" which is tied up so as not to dilute the methanol. Thus the calcium chloride used in the present invention will remove a small amount of free water and convert it to bound water as a calcium chloride hydrate. Similarly Steffens' filtrate (Steffens' liquor hydrolysate) contains a considerable measure of water in bound form. This water is not removed by evaporating the Steffens filtrate to airdry condition but can be driven off by heating the solids obtained by evaporating Steffens' filtrate to 105° C. It has been found that the bound or "bonded" water does not interfere with the precipitation of glutamic acid by the present process and is only important that the free water be kept below 15% and preferably below 10% of the total system volume. Only the free water and not the bound water serves as a diluent for the methanol. Thus in the present process there can be employed Steffens' filtrate containing 35% water by weight as a source of glutamic acid. Part of the water as previously explained is bound water and part free water. Sufficient methanol is added to reduce the free water to below 10% and preferably 5% or less.

The inclusion of ammonia in the solvent has been found to assist the methanol in dissolving the amino acids of the protein hydrolysate. Accordingly, it is possible to use a smaller proportion of methanol in proportion to hydrolysate, than is required in the absence of ammonia. In this regard, ammonia is helpful when used in small proportions, between about 8% and 16% by weight being preferred. In any event, the methanol solution must be alkaline to effect precipitation in accordance with the present invention upon addition of calcium chloride thereto and hence the solution is made alkaline by the addition of a basic substance soluble in methanol such as ammonia or an organic base, or sodium hydroxide, etc. if not already so. The invention is further illustrated, but not limited, by the following detailed examples of actual operations according to the invention.

*Example 1*

Steffens' liquor, a waste product of beet sugar, contains alpha-pyrrolidonecarboxylic acid which is easily converted into glutamic acid. Conversion to glutamic acid is effected by heating, before or after concentrating the liquor, after acidification with hydrochloric acid until a pH of 2.0 is reached followed by maintaining the acidified liquor at about 100° C. for five hours.

The hydrolyzed liquor so obtained contains glutamic acid in admixture with other amino acids and in accordance with the present invention, the glutamic acid is recovered by neutralizing the hydrolyzed liquor with ammonia. The neutralized solution contains calcium salts, and these are removed by addition of oxalic acid to precipitate calcium oxalate which is removed by filtration and washed. The filtrate together with the washings are then evaporated to dryness, the temperature of evaporation being maintained below 100° C. to prevent decomposition. The dry residue so obtained is then dissolved in methanol containing about 8–16%, by weight of ammonia and as free as practicable of water. Sufficient solution is employed to assure the dissolution of substantially all of the glutamic acid present. The addition of small increments of solution to the undissolved residue without noticeable further dissolution is a clear indication of the extraction of all of the glutamic acid. Usually 10 grams of solution is adequate to effect dissolution of substantially all of the glutamic acid present in a gram of dry residue.

The solution so obtained is then treated with anhydrous calcium chloride to effect precipitation of a double compound of calcium glutamate and calcium chloride. Normally, calcium chloride is simply added until further addition thereof fails to produce any additional precipitation. The addition of a stoichiometrically calculated amount of calcium chloride sufficient to form the aforesaid double compound from all of the glutamic acid estimated to be present in the dry residue is sufficient to effect precipitation of at least about 90% of the glutamic acid.

The double compound so prepared is converted into glutamic acid by conventional procedures, as by treatment with sulfuric or oxalic acid which precipitates the calcium in the form of insoluble salts, e. g. calcium sulphate and calcium oxalate, leaving the glutamic acid in solution.

In Example 1 the dry residue of the hydrolyzed Steffens' liquor was in an air dry condition, i. e., it contained bound water but no free water.

The following examples show the effect of increasing the amount of water on the recovery of glutamic acid by way of the double compound of calcium glutamate and calcium chloride. The double compound was formed exactly as in Example 1 and was converted to glutamic acid by treatment with dilute sulfuric acid.

*Example 2*

2 grams of glutamic acid were mixed with 100 ml. of methanol containing 3 ml. of concentrated HCl per 100 ml. solution. An aliquot of this solution was used in the following experiment. Precipitation of the glutamic acid was effected by adding enough ammonia gas from a tank thereof to make the solution ammoniacal and then adding enough anhydrous, powdered calcium chloride until the further addition thereof failed to produce any additional precipitation. The glutamic acid was recovered in a yield of about 92%. When the experiment was repeated but sufficient water was added to the methanol prior to the calcium chloride precipitation to equal 10% by volume of the system there was no loss in yield of the glutamic acid. Similarly there was no loss in yield of glutamic acid when 15% of water by volume was added to the methanol prior to the calcium chloride precipitation. However, when the water was increased to 20% by volume of the system the yield of glutamic acid fell off to a considerable extent.

*Example 3*

Example 2 was repeated replacing the glutamic acid as a starting material by zein hydrolysate. Under the anhydrous conditions the yield of glutamic acid was substantially the same as under anhydrous conditions in Example 2. When the methanol was diluted with 5% by volume of water prior to the calcium chloride precipitation there was no reduction in yield of glutamic acid. When the methanol was diluted with 10% of water by volume the yield of glutamic acid was reduced to 80% of what it was under anhydrous conditions.

*Example 4*

Steffens' filtrate containing 35% of water by weight (44% by volume) which could be driven off by heating at 105° C. overnight (i. e., containing both free and bound water) was employed. Three separate samples of 25 ml. each of this Steffens filtrate were each heated for 6 hours with 10 ml. of concentrated HCl at 100° C. At the end of that time they were partially neutralized with anhydrous sodium carbonate until crystals began to form on the surface of the liquid.

One sample was then evaporated to dryness on a water bath, washed with acetone to remove any moisture present, stirred with 150 ml. of methanol for 1 hour and then the precipitation of glutamic acid from the supernatant liquor carried out by the addition of ammonia gas and calcium chloride as in Example 2. The yield of glutamic acid was substantially the same as under anhydrous conditions in Example 2.

The other two samples of acid digested partially neutralized Steffens' filtrate were each suspended in 150 ml. of methanol without prior evaporation. After 1 hour's stirring, the suspensions were filtered and the filtrates diluted with methanol in order to make the free water content as indicated below. The precipitation of glutamic acid was carried out as in Example 2. In order to decrease the volume of water to 5% it was necessary to increase the volume of the methanol solution to 350 ml. as compared with 150 ml. when no water was present, at 5% of free water the yield of glutamic acid was 90% of that obtained under anhydrous conditions. When the amount of free water was increased to 7% the yield of glutamic acid was 70% of that obtained under anhydrous conditions.

*Example 5*

In another experiment utilizing Steffens' hydrolysate wherein the total amount of water was 10% by volume of the system, there was no loss in yield of glutamic acid as compared to an anhydrous system.

In the appended claims, the term "calcium salt" of glutamic acid or "double compound of calcium glutamate with calcium chloride" are used to define the precipitate obtained when a solution of the amino acids in methanol or in methanol and ammonia is treated with calcium chloride.

I claim:
1. A process of extracting glutamic acid from a member of the group consisting of substantially anhydrous Steffens' liquor hydrolysate and substantially anhydrous protein hydrolysates which comprises forming an alkaline solution of said hydrolysate in substantially anhydrous methanol, adding substantially anhydrous calcium chloride to the resulting solution thereby precipitating the glutamic acid present in the form of a calcium compound and removing said precipitate from the solution.

2. A process of extracting glutamic acid from a member of the group consisting of Steffens' liquor hydrolysate and protein hydrolysates which comprises removing water and mineral acid present to obtain said hydrolysate in the form of a residue which is substantially dry and free from mineral acid, dissolving said residue in substantially water-free methanol to obtain a solution of glutamic acid together with the other amino acids in said hydrolysate, precipitating the glutamic acid present in said solution by the addition to alkalinity of a substantially anhydrous basic substance soluble in methanol and substantially anhydrous calcium chloride and removing the resulting precipitate.

3. The process of claim 2 wherein the methanol has ammonia dissolved therein.

4. A process of extracting glutamic acid from a member of the group consisting of Steffens' liquor hydrolysate and a protein hydrolysate containing the same in admixture with other amino acids which comprises removing substantially all of the water and the mineral acid contained in said hydrolysate to form a dry residue, dissolving said dry residue in substantially water-free methanol to obtain a solution of glutamic acid together with the other amino acids, removing any solid material contained in said solution, precipitating the glutamic acid present in said solution by the addition to alkalinity of a substantially anhydrous basic substance soluble in methanol and substantially anhydrous calcium chloride and removing the precipitate.

5. The process of claim 4 wherein the methanol has ammonia dissolved therein.

6. A process of producing glutamic acid in yields of at least about 90% from a member of the group consisting of Steffens' liquor hydrolysate and protein hydrolysates containing glutamic acid together with other amino acids in water solution containing mineral acid which comprises removing substantially all of the said water and mineral acid contained in said hydrolysate to form a dry residue, dissolving said dry residue in substantially water-free solution of ammonia in methanol containing substantially anhydrous ammonia to obtain a solution of glutamic acid together with other amino acids, removing any solid material contained in said solution, precipitating the glutamic acid present in said solution as the double compound of calcium glutamate with calcium chloride by the addition of substantially anhydrous calcium chloride to said solution, removing said precipitated double compound from said solution and converting said double compound into glutamic acid.

7. An anhydrous double compound of calcium glutamate with calcium chloride.

8. A process according to claim 1 wherein not over 10% of water is present in the system at any time.

9. A process of extracting glutamic acid from substantially anhydrous Steffens' liquor hydrolysate which comprises forming an alkaline solution of said hydrolysate in substantially anhydrous methanol, adding substantially anhydrous calcium chloride to the resulting solution, thereby precipitating the glutamic acid present in the form of a calcium compound.

10. A process according to claim 9 wherein the methanol has ammonia dissolved therein to render the solution alkaline.

11. A process according to claim 10 wherein the calcium chloride is added to the methanol solution until no further precipitate occurs.

12. A process of extracting glutamic acid from a member of the group consisting of Steffens' liquor hydrolysate and a protein hydrolysate which comprises forming an alkaline solution of said hydrolysate in methanol, adding calcium chloride to the resulting solution, thereby precipitating the glutamic acid present in the form of a double compound of calcium glutamate with calcium chloride and removing the precipitate from the solution and keeping the amount of free water in the system at the time of calcium chloride precipitation at not over 15%.

13. A process according to claim 12 wherein the hydrolysate is Steffens' liquor hydrolysate.

14. A process according to claim 13 wherein the amount of free water is not over about 5%.

15. A process of extracting glutamic acid from Steffens' filtrate containing up to 35% by weight of total water comprising hydrolyzing the filtrate with an acid, neutralizing the acid, adding sufficient substantially anhydrous methanol to decrease the free water in the system to not over 5%, adding sufficient ammonia to render the solution ammoniacal and adding calcium chloride to precipitate the glutamic acid as a double compound of calcium glutamate with calcium chloride.

References Cited in the file of this patent

UNITED STATES PATENTS

| | | |
|---|---|---|
| 1,582,472 | Ikeda | Apr. 27, 1926 |
| 2,347,220 | Shildneck | Apr. 29, 1944 |
| 2,433,219 | Hoglan | Dec. 23, 1947 |
| 2,548,124 | Schlaeger et al. | Apr. 10, 1951 |
| 2,657,232 | Borkenhagen | Oct. 27, 1953 |

FOREIGN PATENTS

| | | |
|---|---|---|
| 90,414 | Switzerland | Sept. 1, 1921 |

OTHER REFERENCES

Foreman: Biochemical Journal, vol. 8 (1914), pp. 463–6.

Metayer: Chem. Abs., vol. 47 (1953), col. 3591.